United States Patent [19]

Carney et al.

[11] Patent Number: 4,512,622
[45] Date of Patent: Apr. 23, 1985

[54] CONDUCTOR GUIDE MEANS FOR TELEPHONE CONNECTOR BLOCKS

[75] Inventors: William V. Carney, Oyster Bay; Michael Fasano, Syosset, both of N.Y.

[73] Assignee: Porta Systems Corp., Syosset, N.Y.

[21] Appl. No.: 548,683

[22] Filed: Nov. 4, 1983

[51] Int. Cl.³ .............................................. H01R 13/58
[52] U.S. Cl. .............................. 339/103 M; 339/113 B
[58] Field of Search .............................. 339/97 R–99, 339/103 R, 103 M

[56] References Cited

U.S. PATENT DOCUMENTS 4,178,055 12/1979 Fleischhacker ...................... 339/98
4,192,570 3/1980 Van Horn .............................. 339/98

Primary Examiner—Eugene F. Desmond
Attorney, Agent, or Firm—Charles E. Temko

[57] ABSTRACT

An improved guide means for conductors passing through a telephone connector block in which the conductors are prevented from becoming bunched or unidentifiable. The guide means includes a plurality of slidably engaged tray-like elements, each providing channels for a plurality of conductors connected to terminals in a given horizontal plane, the tray-like elements being serially insertible into corresponding recesses in the block as the block is progressively wired.

3 Claims, 2 Drawing Figures

4,512,622

CONDUCTOR GUIDE MEANS FOR TELEPHONE CONNECTOR BLOCKS

BACKGROUND OF THE INVENTION

This invention relates generally to the field of telephony, and more particularly to an improved conductor guiding means incorporated into known telephone connector blocks to facilitate the manual wiring of the block during manufacture.

Many recent designs of telephone connector blocks feature a three-sided construction in which a pair of oppositely disposed laterally-facing surfaces mount protector modules on one surface and wire wrap pins on another. A forwardly facing surface mounts so-called quick clip connectors arranged in horizontal rows of a convenient multiple, typically several hundred pairs which communicate with incoming subscriber circuits. The circuits pass through the protector modules prior to communication with central office equipment.

While quick clip connectors require relatively little surface, and accordingly afford large connector capacity over a fixed given area, there is always present the problem of routing the conductors from the connectors without confusion, and bunching of conductors in critical areas. In the prior art, this has been provided for by an orificed wire guide on either side of the quick clip area through which the conductors are guided externally of the block. This has resulted in bunching of conductors at the area immediately adjacent the orifice, making both installation and identification difficult, with many wiring errors occurring unless great care is taken.

SUMMARY OF THE INVENTION

Briefly stated, the invention contemplates the provision of an improved telephone connector block utilizing quick clip terminals arranged in rank and file on a surface thereof, the walls supporting the quick clip terminals having elongated recesses for the reception of corresponding inserts containing guideways for the reception of individual conductors positioned in engaged relation with the quick clip terminals. In lieu of the usual laterally positioned orificed guide strips, the insert permits a conductor to exit in a laterally positioned wall for further connection in such manner that each conductor is positively identified as a result of provision for a continuous passage through the block. During the wiring procedure, individual conductors are threaded through the insert, normally in subscriber pairs. The guides themselves are formed as symmetrical moldings, with one-half of each channel disposed in a single molding.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
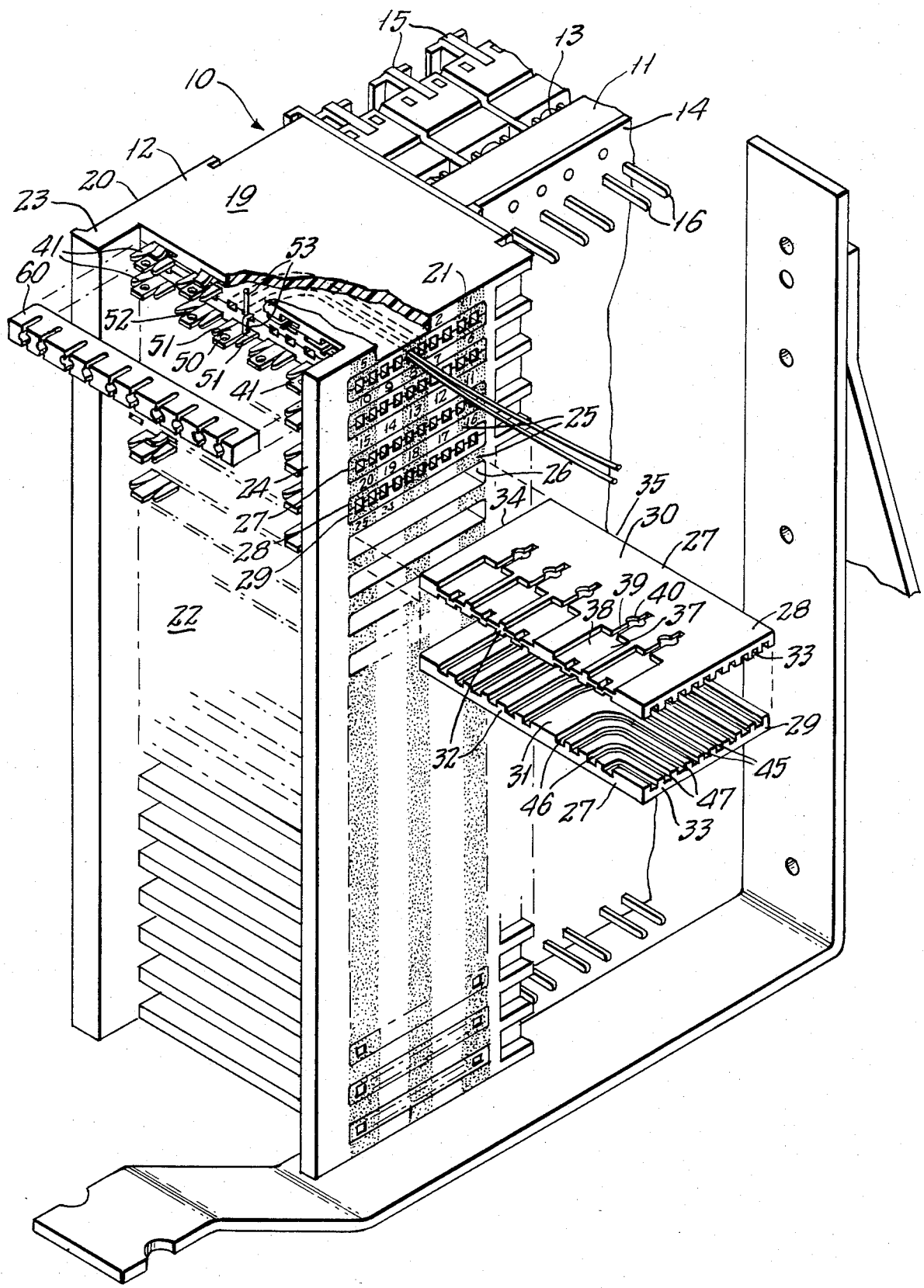
FIG. 1 is a fragmentary view in perspective of an embodiment of the invention, partially exploded for purposes of clarity.
Figure 2:
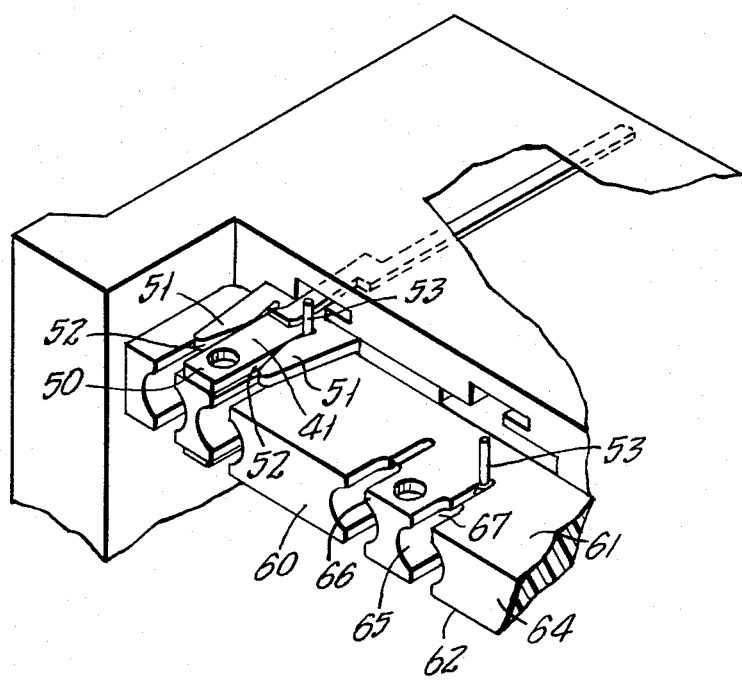
FIG. 2 is a fragmentary perspective view corresponding to the upper left hand portion of FIG. 1.

In accordance with the invention, a connector block, generally indicated by reference character 10, includes an axially aligned wall 11, supporting a transversely extending member 12, as is known in the art. The axially aligned wall 11, is bounded by first and second lateral sides 13 and 14, respectively. The first side 13, includes means for mounting conventional protector modules 15, while the second side 14, mounts known wire wrap pins 16, for connection of conductors to office equipment (not shown).

The transversely extending member 12, is of generally rectangular cross-section, and is bounded by an upper surface 19, a lower surface (not shown), first and second side surfaces 20 and 21, and a forward surface 22, partially enclosed by vertical flanges 23 and 24.

The forward surface 22, is segmented, and formed by a plurality of horizontally disposed integrally molded walls 25, which form horizontally disposed interstices 26 therebetween. Disposed within the interstices 26, are generally planar guide elements 27, each comprising an upper member 28, and a symmetrical lower member 29.

Each of the members 28 and 29, is preferrably formed by molding from synthetic resinous insulative material, and is bounded by an outer planar surface 30, an inner planar surface 31, a front edge 32, an outer side edge 33, an inner side edge 34, and a rear edge 35.

Extending into the outer surface 28, are a plurality of shaped recesses 37, each including a large generally rectangular portion 38, an elongated portion 39, having an enlarged medially disposed portion 40, the recesses 37 corresponding to the overall figuration of a quick clip element 41. The inner surface 31, of each of the members 28–29, is formed to include a plurality of curved channels 45, each having front and side ends 46 and 47, respectively. The channels are open along the entire lengths thereof, and are closed with the placing of the members 28 and 29 in abutted relation as shown in the drawing.

The quick clip elements 41, are generally conventional, each including a central extension 50, and laterally disposed legs 51, forming resiliently expandable interstices 52, for the reception of a conductor 53 therebetween in well known manner.

During assembly of the block, the guide elements 27, are first placed in juxtaposed relation, and slid into position through the interstices 26. Next the quick clip elements 41, are pushed into position from the forward surface 22, to be retained by the engagement of an enlargement (not shown) in the wider part 40, of the elongated portion 39. Conductors are then threaded in pairs through the side ends 47 of the channels 45 until they exit through the front ends 46, at which point they are connected to the quick clip elements 41 in known manner.

It will be observed that, unlike earlier constructions, each subscriber pair is confined to a separate channel 45, which is conveniently labeled at the point of exit, thus avoiding any possibility of confusion when the conductors are subsequently interconnected to other terminals. Normally, where two wires per subscriber circuit are employed, only alternate channels may be employed. In those installations requiring four conductors per subscriber circuit, the tip conductors may be disposed in one channel, and the ring conductors in an adjacent channel.

The present construction permits the use of an optional strain relief element 60, in the form of an elongated synthetic resinous strip which overlies the front edge 32, of a guide element 27, to be positioned between upper and lower pairs of quick clip elements 41. As best seen in Figure each element 60, is bounded by upper and lower surfaces 61 and 62 respectively, an inner surface (not shown), and an outer surface 64, having a plurality of circular bores 65, extending therefrom. The bores are of a diameter slightly less than the thickness of the element, so as to form relatively thin sections 66, which are provided with two part slots 67. When the elements 60 are in position, the slots 67 immediately underly the interstices 52, so that when a conductor 53, is engaged in the interstice, the insulative cover of the same will be wedged into the slot 67, to provide strain relief should the conductor be accidentally pulled or otherwise disturbed.

We wish it to be understood that we do not consider the invention to be limited to the precise details of structure shown and set forth in this specification, for obvious modifications will occur to those skilled in the art to which the invention pertains.

We claim:

1. In a telephone connector block of a type including a first exposed wall mounting a plurality of quick clip connectors for engaging individual subscriber pairs, the improvement comprising: means for guiding individual pairs of conductors through said block to exit therefrom at identified locations for subsequent external connection, said means including a plurality of guide elements; said first exposed wall having a plurality of slotted openings therein disposed, said guide elements being of generally planar configuration and slidably positioned behind a slotted opening to extend inwardly from said first wall, each of said guide elements having channels therein accommodating a single pair of conductors; said block having a second exposed wall disposed at an angle relative to said first wall, and having elongated parallel slotted openings therein lying in co-planar relation relative to said first plurality of slotted openings; said guide elements being positioned with one surface thereof lying within said second plurality of slotted openings, whereby said guide elements provide continuous channels from said first mentioned wall to said second mentioned wall, and conductors may be inserted into said channels from either end thereof.

2. A telephone block in accordance with claim 1, further characterized in each of said individual guide elements being formed of a pair of symmetrically shaped members each including a fractional part of the individual channels enclosed thereby.

3. In a protector block in accordance with claim 1, the provision of strain relief means in the form of an elongated strip positioned to overlie an exposed edge surface of a guide element and located between adjacent pairs of quick clip elements so as to engage the insulative cover of conductors simultaneously with the engagement of the bare conductors with said quick clip elements.

* * * * *